United States Patent [19]

Remion

[11] Patent Number: 5,557,752
[45] Date of Patent: Sep. 17, 1996

[54] TELECOMMUNICATIONS INTERFACE APPARATUS AND METHOD

[76] Inventor: Michel J. Remion, 4001 Westerly Pl., Suite 106, Newport Beach, Calif. 92660

[21] Appl. No.: 532,860

[22] Filed: Sep. 22, 1995

Related U.S. Application Data

[63] Continuation of Ser. No. 234,537, Apr. 28, 1994, abandoned, which is a continuation of Ser. No. 963,273, Oct. 19, 1992, Pat. No. 5,313,580, which is a continuation of Ser. No. 487,766, Mar. 2, 1990, abandoned.

[51] Int. Cl.$^6$ .............................. G06F 13/42; G06F 13/14
[52] U.S. Cl. ................. 395/285; 395/200.15; 364/222.3; 364/284; 364/284.4; 364/260; 364/235; 364/DIG. 1; 379/93
[58] Field of Search ....................... 395/200.02, 200.09, 395/114, 892, 285, 200.15; 379/93; 370/85.1; 340/825.06

[56] References Cited

U.S. PATENT DOCUMENTS

| | | | |
|---|---|---|---|
| 4,418,396 | 11/1983 | Hemdal et al. | 395/275 |
| 4,587,514 | 5/1986 | Schas et al. | 341/87 |
| 4,635,222 | 1/1987 | Tokui et al. | 395/114 |
| 4,641,263 | 2/1987 | Perlman et al. | 395/500 |
| 4,703,450 | 10/1987 | Sueyoshi et al. | 395/892 |
| 4,839,802 | 6/1989 | Wonak et al. | 395/834 |
| 4,845,609 | 7/1989 | Lighthart et al. | 395/275 |
| 4,855,905 | 8/1989 | Estrada et al. | 395/500 |
| 4,868,848 | 9/1989 | Magnusson et al. | 379/355 |
| 5,075,874 | 12/1991 | Steeves et al. | 395/112 |
| 5,088,051 | 2/1992 | Forsythe et al. | 395/117 |
| 5,091,790 | 2/1992 | Silverberg | 358/434 |
| 5,179,587 | 1/1993 | Bock et al. | 379/95 |

*Primary Examiner*—Gopal C. Ray
*Attorney, Agent, or Firm*—Fish & Richardson P.C.

[57] ABSTRACT

An interface apparatus and method for transmitting data between a host computer and a telecommunication network without requiring special host-based computer programs to communicate with the interface apparatus. The invention uses existing ports of the host computer, utilized in their standard method of operation, such as driving a printer or communicating with a workstation. This reduces cost, simplifies use, and permits the use of the telecommunication interface apparatus with any computer utilizing its existing programs. The interface apparatus scans the beginning of a message for a command code comprising a string of special characters and the addressee number and/or code. If such a code is detected, the message is transmitted over the telecommunication network. Otherwise, the message is passed through the interface apparatus unchanged to be printed.

21 Claims, 5 Drawing Sheets

TELECOMMUNICATIONS INTERFACE APPARATUS AND METHOD

This is a continuation of application Ser. No. 08/234,537, filed Apr. 28, 1994, now abandoned, which is a continuation of application Ser. No. 07/963,273, filed on Oct. 19, 1992, now U.S Pat. No. 5,313,580 which is a continuation of application Ser. No. 07/487,766, filed on Mar. 2, 1990, abandoned.

BACKGROUND OF THE INVENTION

1. Field of the Invention

The invention relates to a telecommunication interface apparatus and method, and more particularly to an interface apparatus and method for transmitting data between a host computer and a telecommunication network without retiring special host-based computer programs.

2. Description of the Prior Art

Computers today are often used to communicate to other people and computer systems via telecommunication networks and services such as telex, electronic mail, and facsimile (fax) transmissions. To perform this function, special communication programs (or "software") are required in the user's (or "host") computer to meet the requirements of the telecommunication network.

In the present art, to connect a host computer to a telecommunication network, a physical connection of a communication interface (such as a modem or network gateway module) to a port of the host computer is necessary. The communication interface is in turn connected to the telecommunication network (for example, via telephone wires). The computer port is commonly an RS-232 serial interface port, communicating in ASCII, BSC, or SDLC codes with communication protocols varying depending on the brand of computer. Such protocols are typically implemented within the communication interface in the form of ROM-resident software ("firmware"). The communication protocol must include all of the necessary commands and controls to permit the handling of the interface and to transmit or receive data. Similarly, the protocol must include all necessary controls to differentiate between status and control data coming from the interface and data forming a user's message. Higher level communication software uses the command and control structure of the protocol to effectuate telecommunication sessions. An example of one such protocol is the Hayes AT command protocol used in the microcomputer environment. On larger computers, no standard has emerged at this time.

Requiring special communication software resident in the host computer requirement presents an inconvenience for computer users, since not only must they purchase or write such software, but they also have to write or purchase compatible editing or word processing software to generate the messages or files to be transferred. Alternatively, they can write additional software to link such communication software to their existing word processing or editing software.

It is desirable to provide a method for connecting a computer to a telecommunication interface which does not require any special software in the host computer to communicate with the interface. This would reduce the cost, simplify the use, and permit the installation of the telecommunication interface in any host computer while utilizing the host computer's existing programs. Consequently, the training time of users would be dramatically reduced since they would communicate to the telecommunication interface using their existing programs.

The present invention achieves this goal by linking a transmission interface to the printer port of a host computer, and optionally to a workstation port of the host computer. The invention enables communications to be accomplished using existing programs included in most computers. The invention therefore eliminates the need for special host computer resident communication software.

SUMMARY OF THE INVENTION

The present invention is an apparatus and method for linking a word processor or editor of a host computer via a communication interface module to other computers, telex machines, electronic mail services, or facsimile machines without requiring any special configuration or programing of the host computer.

In the case of a multi-station computer with available ports, communication from the host computer word process or /editor to the communication interface module is performed by allocating one port of the host computer to the communication interface module. In the preferred embodiment of the invention, the outbound port is a printer port.

Optionally, communication from the communication interface module to the host computer can be performed by allocating a port of the host computer to the communication interface module. In the preferred embodiment of the invention, the inbound port is a workstation port or a keyboard port.

A user generates an outgoing message (e.g., facsimile, telex, or electronic mail) by including in the document to be transmitted the type of communication desired and an addressee number and/or code. The user then writes the message as usual. After preparation of the message, the user sends the message to the "printer" emulated by the communication interface module. The communication interface module scans the beginning of the message for a command code comprising a string of special characters and the addressee number and/or code. The communication interface module then performs the necessary tasks to send the message to the desired network as electronic mail, a telex, a facsimile, etc.

If the user desires to take advantage of receiving incoming messages into the host computer, the communication interface module emulates a workstation input and enters the incoming messages into the host computer via a workstation port in the host computer (or, in the case of a microcomputer, through the keyboard port). The user may elect whether or not to use the incoming message feature. In some cases, especially for the facsimile option, a user may elect to have incoming messages printed on a designated printer or fax machine rather than having them stored in the host computer.

The communication interface module may be connected in series with the printer and is transparent to any data not starting with the addressee command string (telex number, fax number, electronic mail network number, etc.). This permits the printer to be used in a normal fashion.

The details of the preferred embodiment of the present invention are set forth below. Once the details of the invention are known, numerous additional innovations and changes will become obvious to one skilled in the art.

BRIEF DESCRIPTION OF THE DRAWINGS

Like numbers and designations in the drawings refer to like elements.

DETAILED DESCRIPTION OF THE INVENTION

Throughout this description, the preferred embodiment and examples shown should be considered as exemplars, rather than limitations on the apparatus and method of the present invention.

Figure 1:
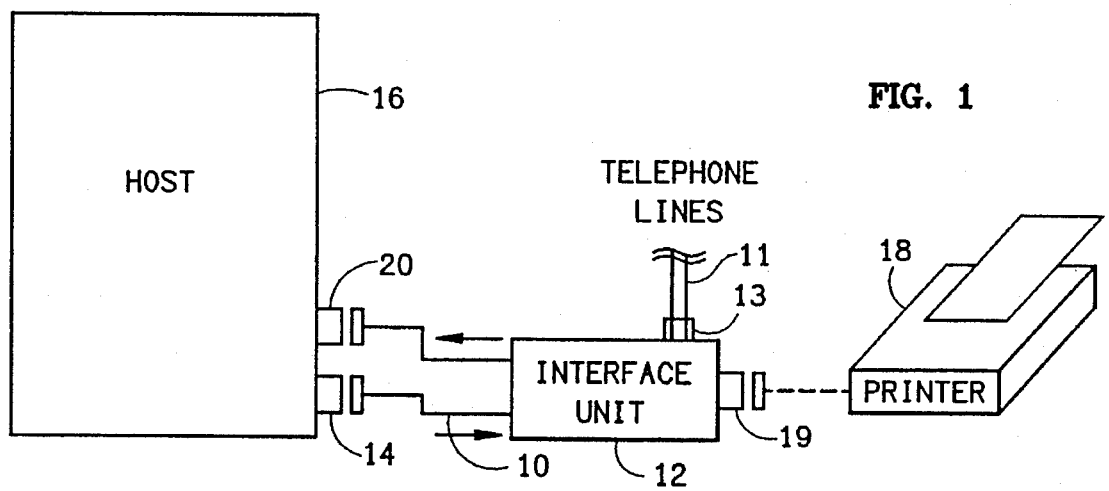
FIG. 1 is schematic diagram showing the present invention coupled between a host computer and an optional printer.

The invention provides an apparatus and method for linking a host computer to a telecommunication interface module without requiring any special software or hardware within the host computer. The invention uses existing ports of the host computer, utilized in their standard method of operation, such as driving a printer or communicating with a workstation. As shown in FIG. 1, the input port 10 of the interface module 12 is connected in series to a printer port 14 of the host computer 16. If the host computer 16 has a printer 18 connected to the printer port 14, the interface module 12 is connected between the printer port 14 and the printer 18, as shown. Thus, the printer 18 is coupled to an output port 19 of the interface module 12. This connection allows the receipt of data by the interface module 12 from any software residing in the host computer 16 that is capable of sending data to a printer. The normal use of the printer 18 is not affected by the interface module 12. The interface module is also coupled to a telecommunications network 11 by means of a communication port 13.

If it is expected that the interface module 12 will upload data or other information to the host computer 16, the interface module 12 emulates a workstation in the preferred embodiment, and is coupled to a workstation port 20 of the host computer 16. Consequently, the interface module 12 is able to access the existing programs of the host computer 16 (such as a word processor) to upload the received data into the host computer 16. If the purpose of the workstation emulation is to upload messages and information to the host computer 16, the exchange of information over the workstation port 20 is normally bidirectional due to handshake, polling, or daisy-chain requirements.

Interaction between the host computer 16 and the interface module 12 is accomplished by the utilization of two different sessions in the preferred embodiment: one for receiving data to be transmitted to the interface module 12 via a printer port 14, and one to upload data from the interface module 12 to the host computer 16 via a workstation port 20 (or, in the case of a microcomputer, the interface module 12 may emulate a keyboard). By the use of two sessions, access to the interface module 12 is available to all existing host computer programs capable of transmitting data to a printer 18, or receiving data from a workstation port 20 or keyboard port.

Figure 2:
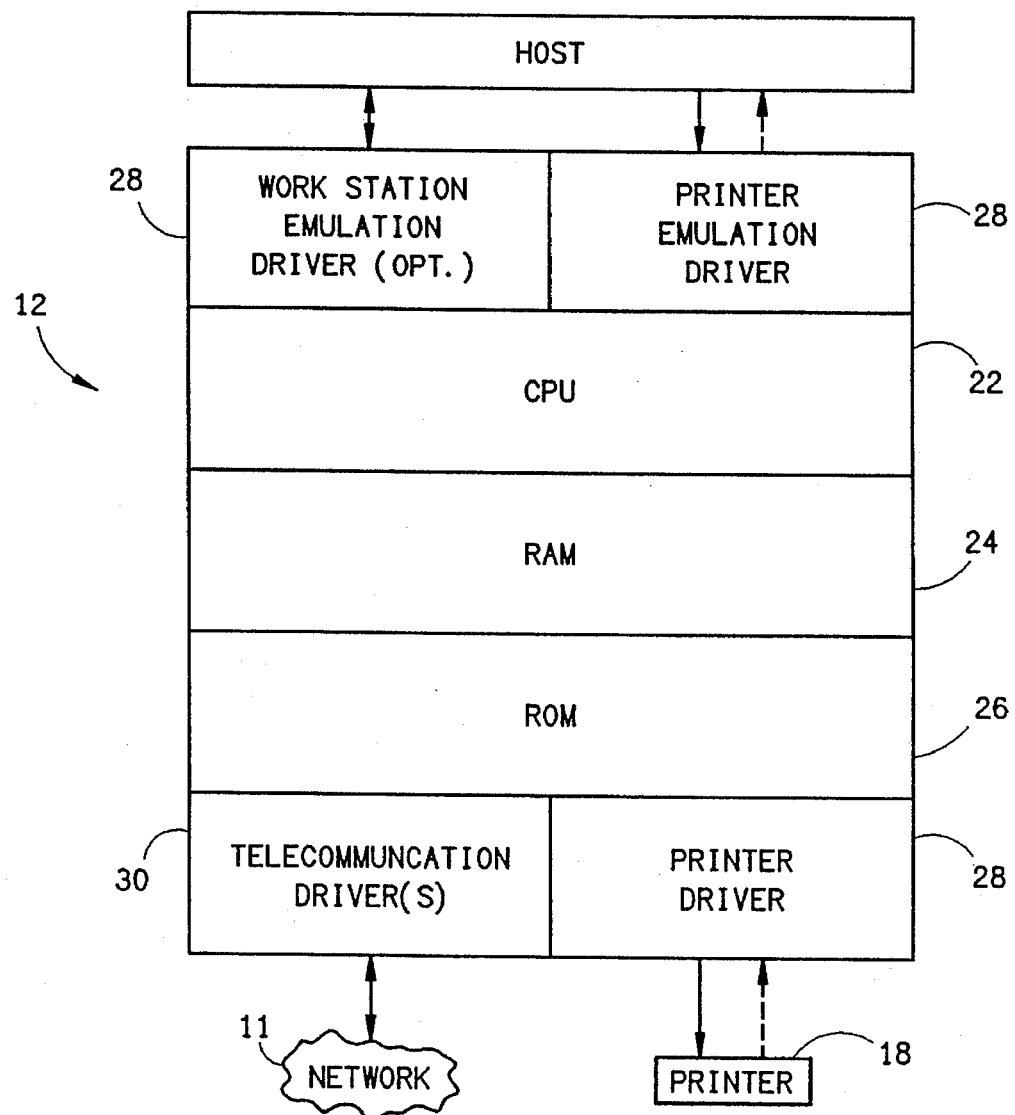
FIG. 2 is block circuit diagram showing one implementation of present invention.

FIG. 2 shows a block diagram of one configuration of the present invention. The interface module 12 comprises a CPU unit 22 (such as an Intel Corporation 8088 or 80286 microprocessor), with associated random access memory 24 ("RAM"), read only memory 26 ("ROM"), interface drivers 28, and communication drivel 30.

The interface drivers 28 include the circuitry, couplings, and programming necessary to communicate over a particular type of port (e.g., an RS-232 serial port, a Centronics-type parallel port, or a coaxial connection). Such apparatus is well known in the art. The software component of each driver simply provides the control functions for transferring data through its respective port. For example, the work station emulation driver shown in FIG. 2 includes software that implements the protocol used by a particular workstation (such as an RS-232 signaling protocol). Similarly, the communication driver 30 comprises circuitry, couplings, and programming for connecting the interface module 12 with a telecommunications network 11. The communication driver 30 therefore may emulate such communications standards as Ethernet, X.25, Bell 202, V.21, etc. Such standards and the methods and apparatus for communication using such standards are well known in the art.

When receiving data on a printer port 14 from a host computer 16, the interface module 12 scans the beginning of the message to see if the data from the port is normal data to be printed on the printer 18 (attached in series to the telecommunications interface module 12), or comprises messages to be sent through the interface module 12 to the telecommunication network 11. A control program residing in the interface module 12 scans the incoming data to detect key words indicating the beginning of a message to be transmitted on the telecommunications network 11. If a key word is not detected near the beginning of the message, the control program will conclude that the message is a regular message to be printed and will transmit the received data to the printer 18. This permits shared-use of the printer port 14 on the host computer 16 by the interface module 12 and the printer 18. Further, the interface module 12 shares the printer 18 itself with the host computer 16 (for example, for printing inbound telecommunication messages and/or status messages).

When the interface module 12 has to transmit data from the telecommunication network 11 to the host computer 16, a separate session emulating a workstation (or a keyboard in the case of a microcomputer) accesses the workstation port 20 of the host computer 16. Utilizing existing programs of the host computer 16 that are capable of receiving data from the workstation port 20, the interface module 12 enters the required data into the host computer 16 in the fashion required by the workstation port 20. Such information may be status or statistical information about the activity of the interface module 12, or incoming messages from the network, such as electronic mail, telex messages, fax transmittals, etc. Depending on the application, the information can be uploaded to the host computer 16 as described above, or transmitted directly to a printer 18 for printing. Alternatively, the interface module 12 may be operated as an outbound device only, and will not accept incoming messages. A user may also elect to have incoming messages printed directly on an attached printer 18 or a fax machine rather than having them first stored in the host computer 16. Implementation of such inbound message receiving and workstation/printer/fax emulation is well known in the art.

Figure 3:
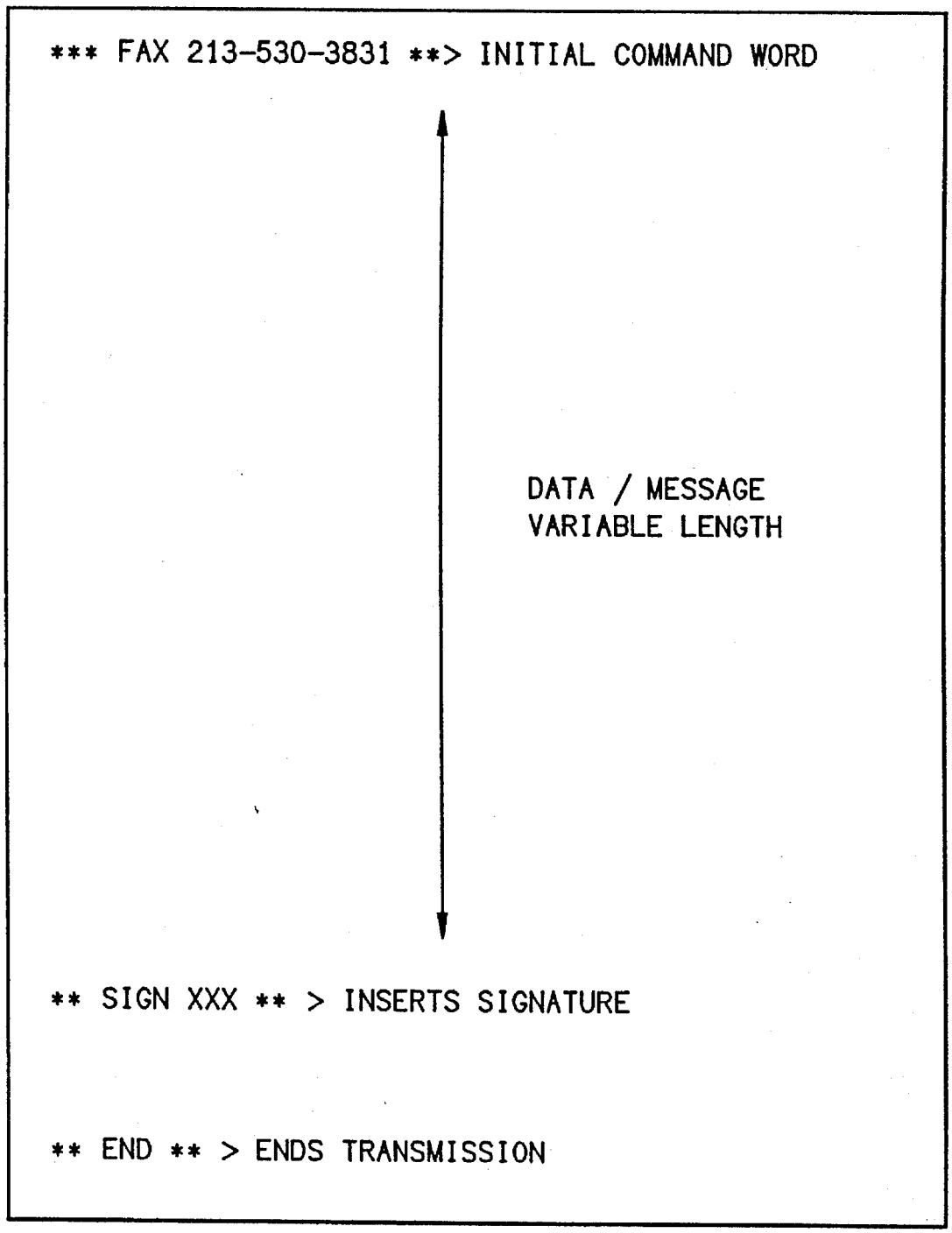
FIG. 3 is diagram showing a preferred message format used with the present invention.

FIG. 3 is a typical example of a document to be transmitted through the host computer printer port 14 to the telecommunication network 11. Near the beginning (for example, within the first ten lines), an initial command key word is included, initializing the process of generating a telecommunications message. Several key words (such as LOGO, SIGN XXX, END) can be located anywhere within the message, but it is required that a first key word be recognized near the beginning of the message. The message preferably ends with an explicit END command, but this is optional.

Following are examples of some key words:

| KEY WORD COMMANDS | MEANING |
| --- | --- |
| FAX 213 539 0324 | fax message to telephone number 213 539 0324 |
| FAX 213 539 9324,fine mode | fax message in fine mode |
| TELEX 814350381 | telex message to country 814, telex number 350381 |
| TELEX 814350381 A/B ACMECO | telex message to country 814, telex number 350381, with answerback ACMECO |
| CO LOGO | insert the company logo (optionally, this may be made automatic) |
| SIGN XXX | insert XXX's signature |
| SEND TO MAILING LIST FIELD | send the message to the persons listed in the mailing list entitled "FIELD" |
| CREATE MAILING LIST FIELD | the names and numbers listed below will form the new mailing list "FIELD" |
| PRINT MAILING LIST FIELD | require the interface module to print the mailing list defined under "FIELD" |
| PRINT ALL STATUS | command to the interface module to print the status of messages |
| UPLOAD STATUS ALL | require the interface module to upload, as an input from the emulated workstation, the status of all traffic |
| INVERT 123 | invert message 123 (received upside down) |
| END | end of a document or session |

In the preferred embodiment, the inventive method scans the incoming data stream from the host computer 16 for (1) two adjacent asterisks (2) following a carriage return, and (3) appearing in the first 10 lines. If such a combination is found, then the characters following the asterisks are scanned to see if they match any permitted command strings. If so, the command is executed to effectuate a communication with the telecommunication network 11. If no paired asterisks and valid command string are found, then the data is treated as being intended for output on the printer 18.

Figure 4A:
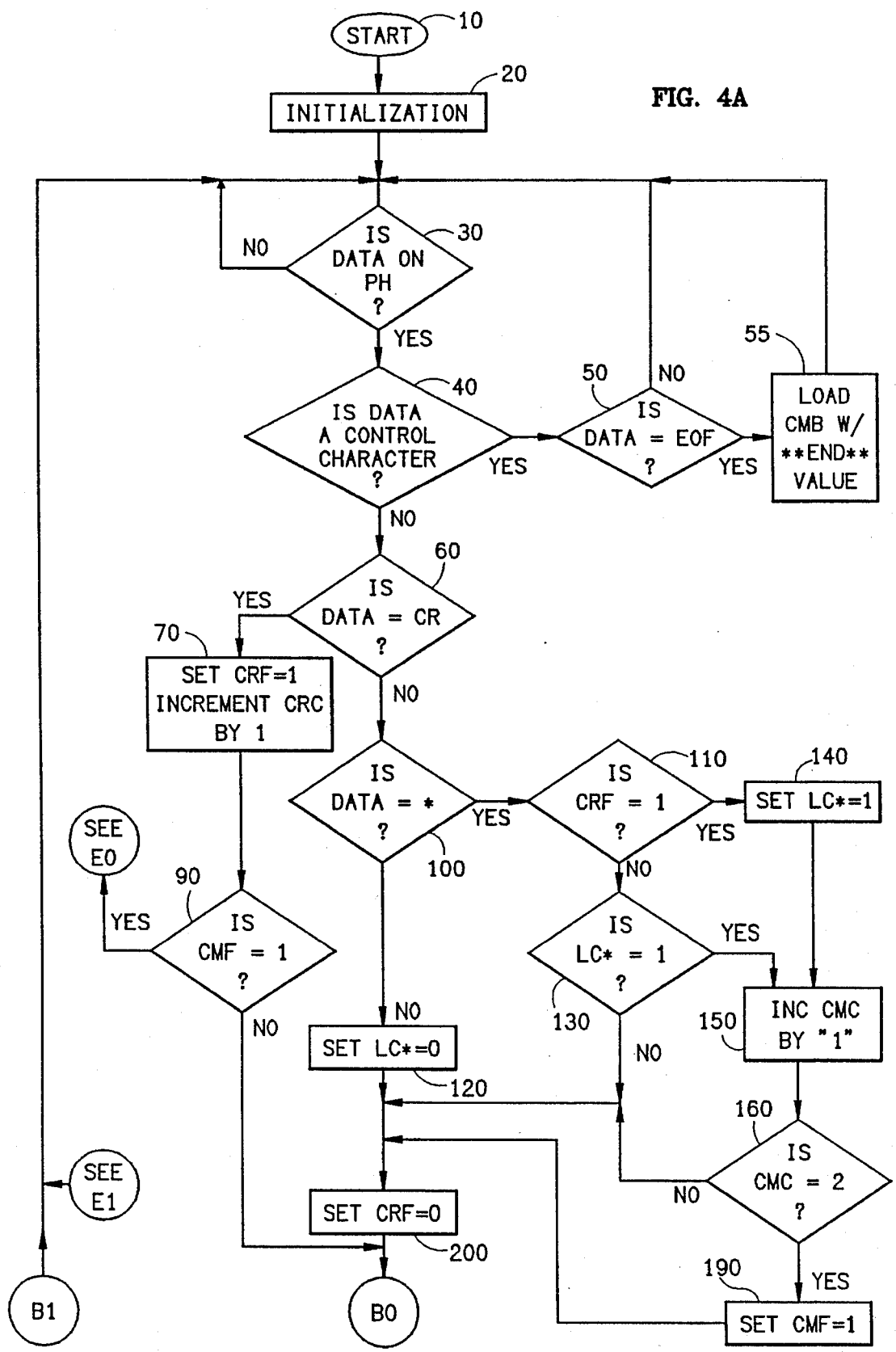
FIG. 4A is flow chart showing the preferred embodiment of the method of the present invention.
Figure 4B:
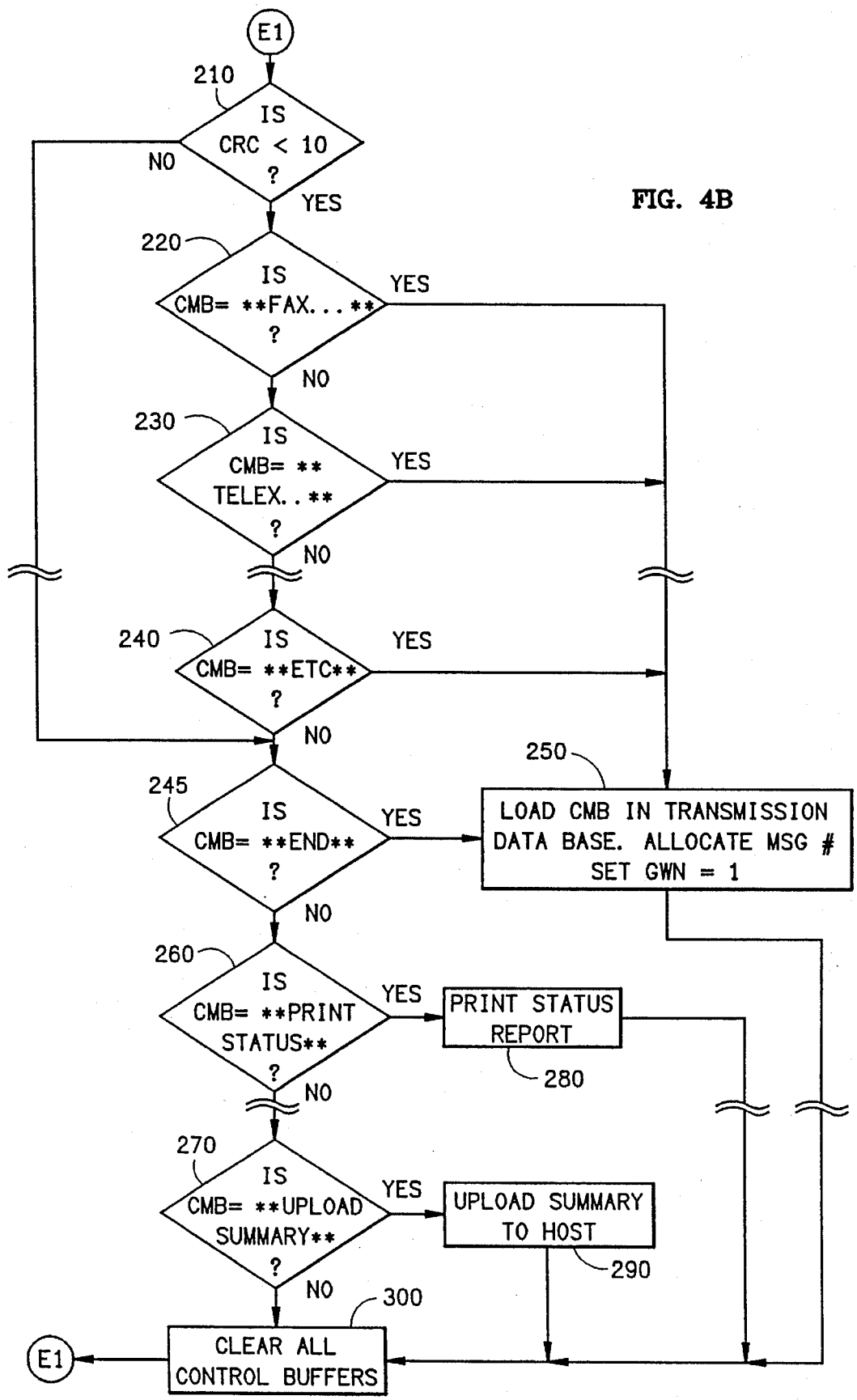
FIG. 4B is a continuation of the flow chart of FIG. 4A.
Figure 4C:
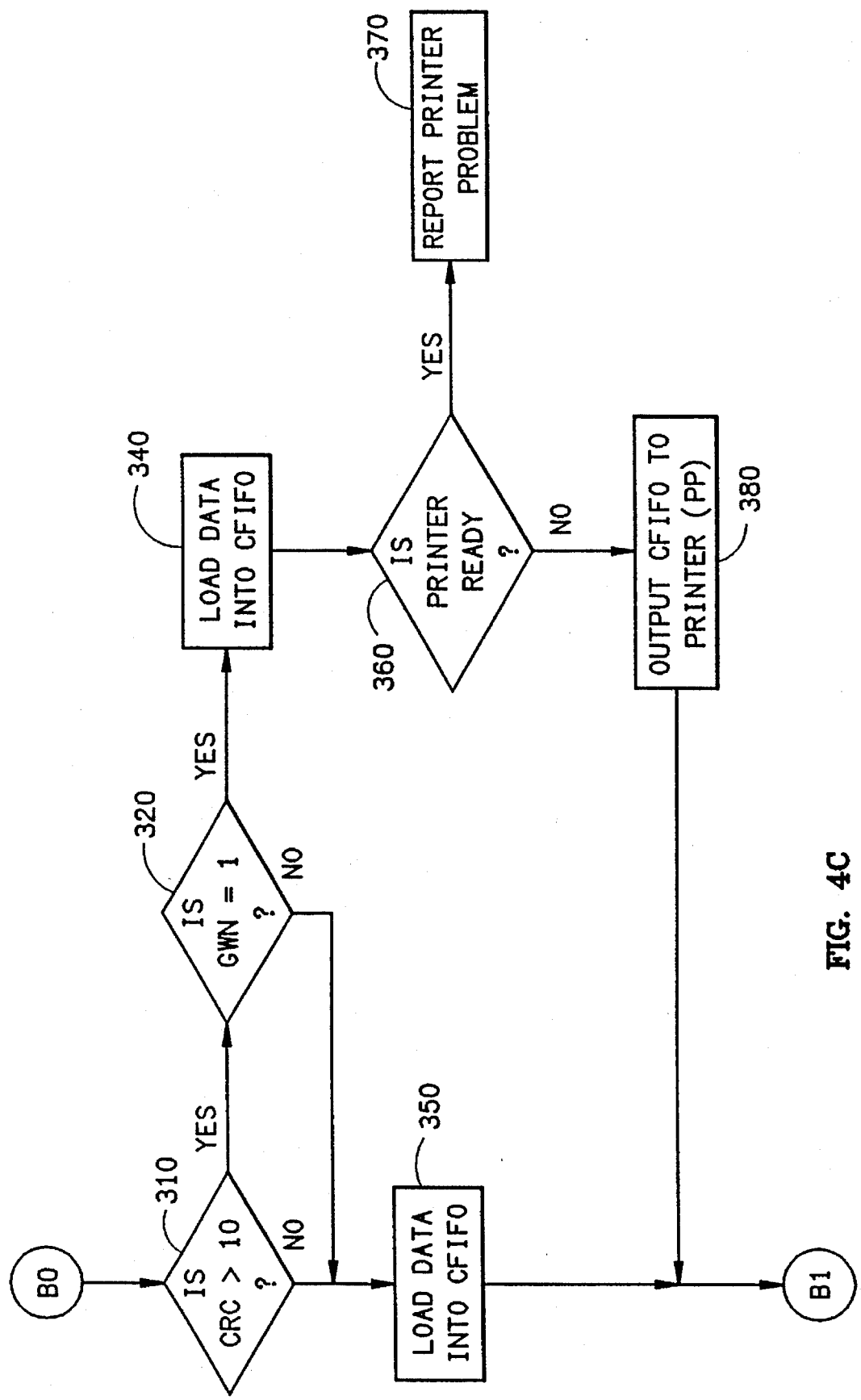
FIG. 4C is a continuation of the flow chart of FIG. 4B.

FIGS. 4A–4B illustrate a flow chart of the process of differentiating between a normal document to be passed through the interface module 12 (for example, for printing) and data that is to be intercepted and transmitted to the telecommunication network 11.

Following is a description of each step:

FIG. 4A

Step 10/20: Start / Initialization:
Do to the routine initialization, plus set the following flags, buffers, and counters:
CRF=Carriage Return Flag
PH=Port to Host computer
CC=Character Counter
CFIFO=Character FIFO
CMF=Command Flag (results of 2 asterisks)
PP=Printer Port
CMB=Command Buffer
CMC=Command Counter (asterisk counter)
CRC=Carriage Return Counter
LC*=Last Character Asterisk Flag
GWN=Gateway Flag Step 30: Scan the printer port of the host computer for incoming data.

Step 40: Test if the data from the printer port comprises a printable character or a control character.

Step 50: If a control character, test if it is for an end-of-file character, which will be equated to an END command and loaded into the Command Buffer (Step 55).

Step 60/70: Test if the character is a carriage return. If so, set the carriage return flag to 1, and increment the Carriage Return Counter. This will enable the recognition of the ** character pair at the beginning of a line, and also permit limiting scanning a message for a key word command to the first 10 lines of a message.

Step 90: If the Command Flag equals 1 (meaning 2 asterisks in a row have been detected after a carriage return), analyze the content of the Command Buffer for commands, as described in FIG. 4B.

Step 100: Test if the character is an asterisk.

Step 110: Test if the Carriage Return Flag equals 1. This differentiates between an asterisk following a carriage return and an asterisk inside of a line of text.

Step 120: Set the Last Character Asterisk Flag to 0 if the character is not an asterisk.

Step 130: If the previous character was an asterisk, increment the Command Counter by 1 (Step 150).

Step 140: If an asterisk follows a carriage return, set the Last Character Asterisk Flag on and increment the Command Counter by 1 (Step 150).

Step 160/190: If the Command Counter equals 2 (meaning 2 adjacent asterisks have been found), then set the Command Flag to 1.

Step 200: Set the carriage return flag equal to 0, since the character received is not a carriage return.

FIG. 4B

Step 210: If the Carriage Return Counter is greater than 10, bypass the search for a command word, since it is a prerequisite that a key word command be within the first 10 lines.

Step 220–240: Repeatedly test for a key word command, which has to be located within the first 10 lines of the message coming from the host computer in the preferred embodiment. When such a key word is found, it is loaded into the Command Buffer (Step 250), and transmitted to a command data base, which manages the communications session with the network.

Step 245: Test if the END key word is present. This key word indicates the end of the message being transmitted to the network.

Step 260 or 270: Test for a command requiring status of information on the printer or on the workstation port. If found, execute the respective command (Step 280 or Step 290).

Step 300: Clear all control buffers when done testing, printing, or uploading.

FIG. 4C

Step 310: Test if the character received is within the first 10 lines of text. If not, load the character into the Character FIFO (Step 350).

Step 320: Test if the Gateway Flag is on when the incoming character is above the tenth line. If so, load the character into the Character FIFO (Step 350) with no additional action. If not (indicating that no key word command has been received), the character is loaded into the Character FIFO (Step 340).

Step 360: If the printer is ready, the characters in the Character FIFO are transmitted to the printer (Step 380). If not, an error flag is set to indicate a problem with the printer (Step 370).

Thus, the present invention can link a word processor or editor of a host computer 16 via the interface module 12 to other computers, telex machines, electronic mail services, or facsimile machines without requiring any special configuration or programming of the host computer 16. A user need only add text strings comprising key word commands to documents to cause the documents to be routed to the telecommunication network 11. The interface module 12 is otherwise transparent to any data not containing such key word commands, thereby permitting the output port of the host computer 16 to be used in a normal fashion, such as transmitting data to a printer 18.

A number of embodiments of the present invention have been described. Nevertheless, it will be understood that various modifications may be made without departing from the spirit and scope of the invention. For example, the initial key word command may be located within any desired number of lines from the beginning of the message. The key word designators may be defined as character combinations other than two asterisks following a carriage return. The ports used may be any type of port capable of operation in a manner similar to that described above for the printer port 14 and workstation (or keyboard) port 20, and may operate with parallel or serial data. The invention may be configured for communication using protocols and standards other than those set forth above as examples. Accordingly, it is to be understood that the invention is not to be limited by the specific illustrated embodiment, but only by the scope of the appended claims.

I claim:

1. A method for transmitting data between a printer port of a host computer and a telecommunication network using a printer interface protocol to communicate with an interface module, comprising the steps of:
   a. receiving within the interface module print data from the host computer via a printer port of the host computer;
   b. identifying from among a first predetermined amount of the received print data a first predetermined command code embedded in the print data, if such command code is present; and
   c. transmitting the received print data to the telecommunication network in response to the presence and identification of the first predetermined command code.

2. The method of claim 1, further including the step of terminating the transmission of the received data if the data received from the host computer terminates.

3. The method of claim 1, further including the step of terminating the transmission of the received data if a second predetermined command code is received from the host computer.

4. The method of claim 1, further including the step of transmitting the received print data to a peripheral device of the host computer if the first predetermined command code is not present within the first predetermined amount of the received print data.

5. The method of claim 1, further including the steps of:
   a. receiving data from the telecommunication network; and
   b. selectively transmitting the data received from the telecommunication network to the host computer via a second port of the host computer.

6. The method of claim 5, further including the step of selectively transmitting the data received from the telecommunication network to a peripheral device of the host computer.

7. The method of claim 1, further including the step of selectively transmitting status data, indicative of the status of the interface module, to the host computer via a second port of the host computer.

8. The method of claim 1, further including the step of selectively transmitting status data, indicative of the status of the interface module, to a peripheral device of the host computer.

9. A method for transmitting data between a printer port of a host computer and a telecommunication network using a printer interface protocol to communicate with an interface module, comprising the steps of:
   a. receiving within the interface module print data from the host computer via a printer port of the host computer;
   b. identifying from among a first predetermined amount of the received print data the presence of a first predetermined command code embedded in the print data;
   c. if the first predetermined command code is present and identified within the predetermined amount of received print data, then:
      i. transmitting the received print data to the telecommunication network by means of the interface module; and
      ii. terminating the transmission of the received data if the transmission from the host computer terminates or if a second predetermined command code is received from the printer port of the host computer;
   d. otherwise, transmitting the received print data by means of the interface module to a peripheral device of the host computer if the first predetermined command code is not detected within the predetermined amount of received print data.

10. The method of claim 9, further including the steps of:
    a. receiving data in the interface module from the telecommunication network; and
    b. selectively transmitting the data received from the telecommunication network to the host computer via a second port of the host computer, or to a peripheral device of the host computer by means of the interface module.

11. The method of claim 10, further including the step of selectively transmitting status data, indicative of the status of the interface module, to the host computer via a second port of the host computer, or to a peripheral device of the host computer by means of the interface module.

12. An interface apparatus for transmitting data between a printer port of a host computer and a telecommunication network using a printer interface protocol to communicate with the interface apparatus, including:
    a. host receiving means, coupled to a printer port of the host computer, for receiving print data from the host computer transmitted by the host computer as print data via the printer port;
    b. identifying means, coupled to the host receiving means, for identifying within a predetermined amount of the received print data the presence of a first predetermined command code embedded in the print data; and c. network transmission means, coupled to the host receiving means, the identifying means, and the telecommunication network, for transmitting the received print data to the telecommunication network if the first predetermined command code is present and identified within the predetermined amount of received print data, and otherwise not transmitting the received print data to the telecommunication network.

13. The apparatus of claim 12, wherein the identifying means terminates the transmission of the received data if the received data terminates.

14. The apparatus of claim 12, wherein the identifying means terminates the transmission of the received data if a second predetermined command code is received from the host computer.

15. The apparatus of claim 12, further including output means, coupled to the host receiving means and the identifying means, for transmitting the received data to a peripheral device coupled to the output means if the first predetermined command code is not detected within the predetermined amount of received data.

16. The apparatus of claim 12, further including:
   a. network receiving means, coupled to the telecommunication network, for receiving data from the telecommunication network; and
   b. switching means, coupled to the network receiving means and a second port of the host computer, for selectively transmitting the data received from the telecommunication network to the host computer via the second port.

17. The apparatus of claim 16, wherein the switching means is coupled to a peripheral device, and further includes means for selectively transmitting the data received from the telecommunication network to the peripheral device.

18. The apparatus of claim 12, further including status reporting means, coupled to a second port of the host computer and to a peripheral device, for selectively transmitting status data, indicative of the status of the interface apparatus, to the host computer via the second port or to the peripheral device.

19. An interface apparatus for transmitting data between a printer port of a host computer and a telecommunication network using a printer interface protocol to communicate with the interface apparatus, including:

a. host receiving means, coupled to a first port of the host computer, for receiving data from the printer port of the host computer;

b. identifying means, coupled to the host receiving means, for identifying within a predetermined amount of the received data a first predetermined command code embedded in the print data, if present;

c. network transmission means, coupled to the host receiving means, the identifying means, and the telecommunication network, for:
   i. transmitting the received data to the telecommunication network if the first predetermined command code is identified and present within the predetermined amount of received data; and
   ii. terminating the transmission of the received data if the received data terminates or if a second predetermined command code is received from the host computer; and d. output means, coupled to the host receiving means and the identifying means, for transmitting the received data to a peripheral device coupled to the output means if the first predetermined command code is not identified or present within the predetermined amount of received data.

20. The apparatus of claim 19, further including:

a. network receiving means, coupled to the telecommunication network, for receiving data from the telecommunication network; and b. switching means, coupled to the network receiving means, the output means, and a second port of the host computer, for selectively transmitting the data received from the telecommunication network to the host computer via the second port, or to the peripheral device.

21. The apparatus of claim 19, further including status reporting means, coupled to a second port of the host computer and to the peripheral device, for selectively transmitting status data, indicative of the status of the interface apparatus, to the host computer via the second port or to the peripheral device.

* * * * *